United States Patent [19]

Conley et al.

[11] E Re. 29,621

[45] Reissued May 2, 1978

[54] VARIABLE CAPACITY MULTIPLE COMPRESSOR REFRIGERATION SYSTEM

[75] Inventors: Thomas F. Conley, Staunton, Va.; Ernest F. Gylland, Jr., Seattle, Wash.

[73] Assignee: Westinghouse Electric Corp., Pittsburgh, Pa.

[21] Appl. No.: 732,697

[22] Filed: Oct. 14, 1976

Related U.S. Patent Documents

Reissue of:

[64] Patent No.: 3,775,995
Issued: Dec. 4, 1973
Appl. No.: 272,704
Filed: Jul. 17, 1972

[51] Int. Cl.[2] ..... F25B 41/00

[52] U.S. Cl. ..... 62/196 A; 62/227; 62/228; 62/510

[58] Field of Search ..... 62/196 A, 510, 227, 62/228, 175, 176 B; 236/1 E

[56] References Cited

U.S. PATENT DOCUMENTS

| | | | |
|---|---|---|---|
| 2,253,623 | 8/1941 | Jordon | 62/510 |
| 2,865,610 | 12/1958 | Sparrow | 236/1 E UX |
| 3,022,642 | 2/1962 | Long | 62/196 A |
| 3,126,713 | 3/1964 | Parker | 62/510 X |
| 3,495,418 | 2/1970 | Kapich | 62/510 X |
| 3,503,223 | 3/1970 | Parker | 62/510 |

FOREIGN PATENT DOCUMENTS

| | | | |
|---|---|---|---|
| 705,999 | 3/1954 | United Kingdom | 62/510 |

*Primary Examiner*—William E. Wayner

*Attorney, Agent, or Firm*—E. C. Arenz

[57] ABSTRACT

A variable capacity multiple compressor refrigeration system having first and second compressors with the first compressor to be always running when the system is operating and the second compressor to be cycled off or to vary the capacity of the system on while the first compressor continues to run. The discharge lines of both compressors are connected together in parallel to the system and a check valve is provided in the discharge line connection between the compressors to prevent discharge pressure from the operating compressor from entering the discharge port of the nonrunning compressor. A by-pass line connects the suction of the system at the inlet of the second compressor to its discharge line between the check valve and its discharge port and a solenoid valve in the by-pass line is arranged to be closed when the second compressor is running and open when it is cycled off.

In one form of the invention, both compressors are multiple cylinder hermetic shell compressors and the inlet of the second compressor is connected to the system through the shell of the first compressor. Also, the first compressor is provided with unloading mechanism to unload some of its cylinders for part unloaded operation, so that four steps of different capacity may be obtained by running the first compressor either loaded or partly unloaded while the second compressor is cycled off or on and therefore, with the aforementioned inlet arrangement, effectively high saturated gas discharge temperatures may be obtained without over heating either compressor for any of the capacity steps of operation.

3 Claims, 3 Drawing Figures

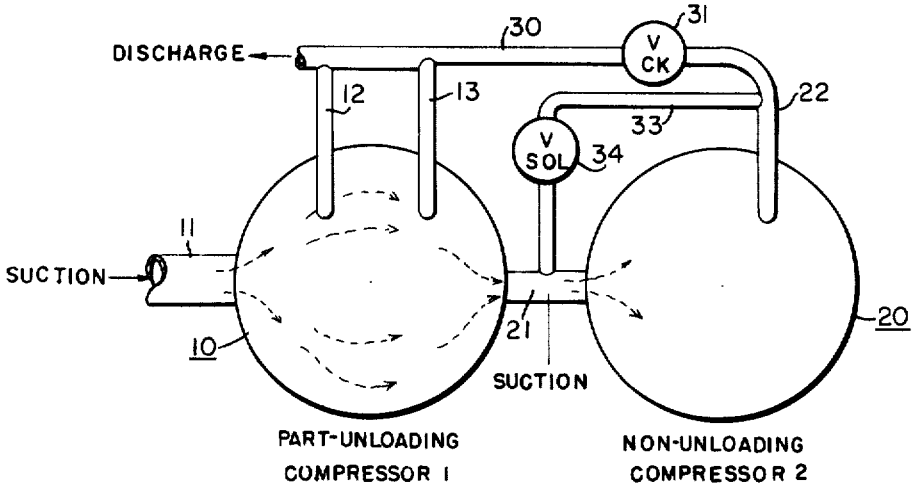
FIG. 1
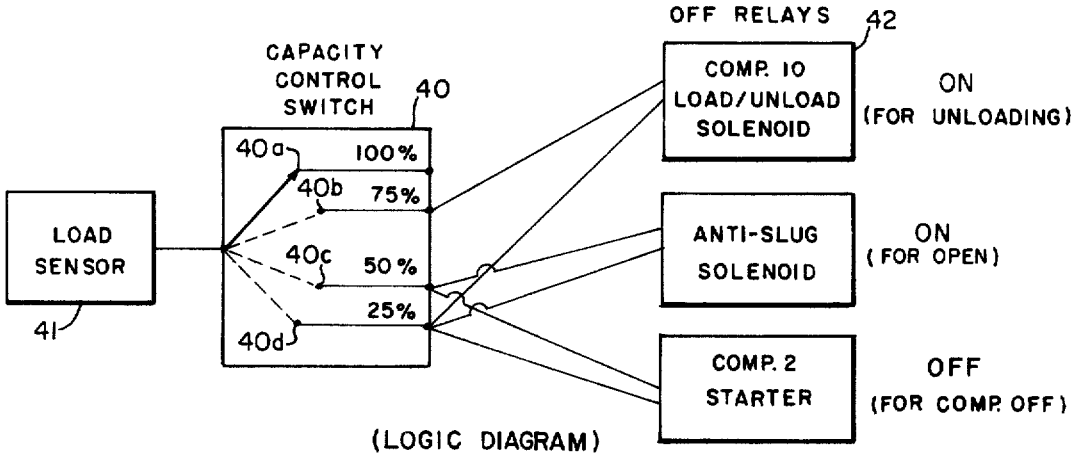
FIG. 2
| % LOAD | COMP. 10 % LOAD | COMP. 20 % LOAD | SAT. DISCH. LIMIT, °F. (R22, 40° SAT. SUCT. |
|---|---|---|---|
| 100 | 100 | 100 | 145 |
| 75 | 50 | 100 | 135 |
| 50 | 100 | 0 | 145 |
| 25 | 50 | 0 | 125 |
FIG. 3

VARIABLE CAPACITY MULTIPLE COMPRESSOR REFRIGERATION SYSTEM

Matter enclosed in heavy brackets [ ] appears in the original patent but forms no part of this reissue specification; matter printed in italics indicates the additions made by reissue.

CROSS REFERENCE TO RELATED PATENT APPLICATIONS

A dual compressor refrigeration system is disclosed and claimed in the co-pending patent application Ser. No. 264,101, assigned to the same assignee as the subject patent application.

BACKGROUND OF THE INVENTION

It is known to provide two or more compressors to be connected in parallel to a single refrigeration system and to cycle off or on a compressor while another compressor continues to run to provide variable capacity for the system. However, such systems have problems involved when a cycled-off compressor is turned on to start running while another compressor is at that time running in the system to create a system pressure against which the starting compressor must start. Also, if any of the multiple compressors are of the part unloading multiple cylinder hermetic shell type, the maximum saturated discharge temperature for safe operation of the part unloaded running compressor will be lower than when the compressor is running fully loaded because of the work done on and the heating of the recirculating refrigerant gas in the shell of the part unloaded compressor. In a multiple compressor system, this means that the upper limit of saturated gas discharge temperature will be lower than would be possible if no part unloading compressors were to be in operation. It is believed desirable to have the safe upper limit of saturated gas discharge temperature to be as high as possible for any given step capacity condition of operation of the system. According to this invention, a first one of the hermetic shell compressors is a multicylinder part unloading compressor to be always running either fully loaded or part unloaded when the system operates and the second hermetic shell compressor which is to be cycled off or on is connected to the system with its inlet suction line connected through the shell of the first compressor so that when the first compressor is running in part unloaded condition, the recirculating gas in its shell will be mixed with and drawn into the shell of the second compressor, when running, enabling the safe saturated gas upper temperature limit for the discharge gas from either compressor to be higher than could be possible if the suction inlet for the second compressor was not connected to the system through the shell of the first compressor.

PRIOR ART

Applicants are not aware of any prior art patents disclosing refrigeration systems with multiple hermetic compressors connected in the arrangement of the invention for providing improved starting and running characteristics for the system and the compressors in the system.

SUMMARY

A variable capacity multiple compressor refrigeration system is provided with first and second having their discharge ports connected together in parallel by suitable discharge lines to the system. The first compressor is intended to be always running when the system operates while at the same time the second compressor may be cycled off or on to vary the capacity of the system. A check valve is provided in the parallel connection of the discharge lines to prevent discharge pressure of the first compressor from entering the discharge port of the second compressor when the second compressor is not running. In order to prevent the buildup of discharge in the port of the second compressor as may be caused by leakage of the check valve, a by-pass line is provided from the discharge port of the second compressor to its suction and a valve is positioned in the by-pass line and controlled to be open when the second compressor is not running and closed when such compressor is running. Thus, the second compressor may be started without being loaded by pressure in the system while the first compressor is running and without danger of liquid slugging.

In a preferred form of the invention, the first and second compressors are hermetic shell compressors and in addition the first compressor is a multi-cylinder compressor having means to controllably unload some of its cylinders so that it may be operated part unloaded for reduced capacity. It is known that a part unloaded compressor will have a lower safe upper operating limit of saturated discharge gas temperature due to the work done on and heating of the recirculating gas in the hermetic compressor shell by the unloaded cylinders and apparatus. In accordance with this invention, the inlet for the second compressor is connected to the system through the shell of the first compressor so that some of the recirculating gas in the first compressor, while operating partly unloaded, is distributed to the second compressor when the second compressor is operating. Thus, a higher safe operating limit of saturated gas discharge temperature for the system may be be obtained without damage to the first compressor when operating part unloaded under such conditions. Logic switch cycle control means responsive to refrigeration demand is provided to enable four steps of different capacity for the system to be obtained as follows. When the switch is in a first position corresponding to maximum demand, both compressors are controlled to be operating fully loaded with the valve in the bypass line controlled to be closed. A second position of the logic switch will partly unload the first compressor while the second compressor continues to run, also with the bypass valve closed. The third position of the logic switch will control the first compressor to run fully loaded and cycle off the second compressor while at the same time controlling the valve in the bypass line to be open. A fourth position of the logic switch will partly unload the first compressor while cycling off the second compressor and keeping the bypass valve open.

Further features and advantages of the invention will be apparent with reference to the following detailed specification and the drawing.

DESCRIPTION OF THE DRAWINGS

FIG. 1 is a fragmentary diagrammatic layout of a refrigeration system with refrigerant compressors connected in the manner of the invention;

FIG. 2 is a logic operational diagram of a control switch and the interconnections to the system elements shown in FIG. 1; and FIG. 3 is a chart of typical conditions of operation for four different capacity steps as enabled by the system of the invention shown in FIGS. 1 and 2.

DESCRIPTION OF THE PREFERRED EMBODIMENT

Referring to FIG. 1 of the drawing, a first compressor 10 and a second compressor 20 which are preferably of the hermetic shell type well known in the art are adapted to be connected to the refrigeration system (not shown) in the manner of the invention to be described. The suction port 11 communicating with the interior of the shell of the first compressor 10 is to be connected to the refrigeration system at the conventional point (not shown). The suction port of the second compressor 20 is connected at 21 into the shell of the hermetic compressor 10 and therethrough to the suction port connection 11 and to the refrigeration system. The first hermetic compressor 10 which may be a multi-cylinder part unloading type well known in the art can be provided with a discharge port 12 connected to the cylinders that cannot be unloaded and a discharge port 13 connected to the cylinders that can be unloaded and it should be understood that there is a check valve (not shown) in the port 13 to the unloading cylinders as is well known in the art to enable the loaded cylinder discharge from port 12 to establish a pressure in the refrigeration system when the unloading cylinders are in the unloaded condition. Compressor 20 is provided with a single discharge port 22 and all of the discharge ports 12, 13 and 22 are adapted to be connected in parallel by the discharge line 30 to the high pressure side of the refrigeration system.

In accordance with the invention, a check valve 31 is interposed between the discharge line 30 and the discharge port 22 to prevent the high gas pressure in the line 30, when only compressor 10 is running, from feeding back to the discharge port 22 of the not running compressor 20 when such condition of operation for the compressors is required as will be later described. In the system being described, it is intended that compressor 10 will be always running and compressor 20 will be at times cycled off to be not running for a lower capacity of the system. When compressor 20 is to be restarted while compressor 10 is already running with pressure in the system, the provision of the check valve 31 facilitates the restarting of compressor 20 without necessarily having to overcome the existing high pressure of the system, assuming the pressure in the discharge port of compressor 20 to have been equalized.

Since it is possible that the check valve 31 might leak slightly to gradually build up a pressure in the discharge port 22, which could cause slugging of the compressor 20 when it is started, the invention provides a by-pass line 33 connected between the discharge port 22 and the suction port 21 of the compressor 20. A solenoid valve 34 is positioned in the by-pass line 33 to be controlled to be closed when compressor 20 is running and open when it is not running so that any leakage past the check valve 31 will be returned to the suction port 21 and the shells of the compressors 10 and 20 without building up a pressure in the discharge port 22 when compressor 20 is not running. Also, when the valve 34 is open, any pre-existing pressure in the discharge port 22 will be by-passed and equalized. Of course, when compressor 20 is to be started to run, the solenoid valve 34 is operated to be closed so that discharge pressure in the port 22 will not be by-passed back to suction.

Referring to FIG. 2 of the drawing, a capacity control logic switch 40 is shown by a logic diagram to have four switch position of operation which may be determined by a refrigerant load sensor 41 of any suitable type known to those skilled in the art. The first switch position shown at 40a corresponds to the position assumed when 100 percent of the system capacity is required by the load sensor. When the switch 41 is in position 40a, the unloading solenoid 42, which when in the on position will unload the cylinders connected to discharge port 13, will not be energized and will be in the off position and both compressors 10 and 20 will be started and running to give full or 100 percent capacity to the system. When the capacity control switch 40 is moved by the load sensor 41 to switch position 40b corresponding to a demand of 75 percent of system capacity, the unloading solenoid 42 will be in the on position to unload the cylinders connected to the discharge port 13. For purposes of this description, it is assumed that half of the cylinders of compressor 10 are unloaded cylinders connected to port 13 and that the capacities of both compressors 10 and 20 are equal. Thus, when both compressors 10 and 20 are running, with switch 41 at position 40b and half of the cylinders of compressor 10 unloaded, a capacity equal to 75 percent of the system capacity is produced. When the capacity switch control 40 is in position 40c, the starter switch and circuit 43 for compressor 20 will be conditioned off to stop compressor 20 from running while compressor 10 continues to run. However, at this time, the unload solenoid 42 will not be in the on position and compressor 10 will be running at its fully loaded condition so that 50 percent capacity of the system is obtained. At the same time, the anti-slug solenoid 44 for the solenoid valve 34 will be in the on or valve open condition so as to bypass any leakage of gas passing check valve 31 as previously described and preventing slugging of compressor 20 when it is subsequently restarted. At position 41d of the capacity control switch 40, the unload solenoid 42 will be in the on position, compressor starter 43 for compressor 20 will be off and the anti-slug solenoid 44 will be on to open valve 34 thus producing 25 percent of the total capacity of the system by only operating compressor 10 in half unloaded condition.

Referring to the chart of FIG. 3, comparative values are given to show the performance of the system described above. Assuming a saturated gas suction temperature of 40° F with both compressors 10 and 20 running fully loaded, an upper limit of saturated discharge temperature of 145° F is obtainable without damage to the compressors for a given system and compressors. At 75 percent capacity with compressor 10 running half unloaded, the upper safe limit of saturated discharge temperature is 135° F for the same system which is only 10° F less than for 100 percent capacity operation. At 50 percent of system capacity, with only compressor 10 running fully loaded, the upper saturated discharge gas temperatue is again 145° F for the same system. At 25 percent of system capacity with only compressor 10 running half unloaded, the upper safe limit of saturated discharge gas temperature is 125° F which is the lowest safe limit mentioned for the same system because there is no distribution of recirculating gas from the shell of compressor 10 into the shell of compressor 20 when compressor 20 is not running.

In order to simplify the description, no electrical circuit details for implementing the logic diagram of FIG. 2 have been given, it being obvious to one skilled in the art that various circuits, solenoid valves, and compressor unloading solenoid arrangements that are well known could be used. Also, although four combinational arrangements of two compressors of equal capacity in which only one compressor is capable of being unloaded to 50 percent of its capacity have been specifically described, the teachings of this invention are applicable with the advantages as described to other combinations of compressors of different capacities that may be part unloaded or not so long as the suction gas for the compressor that may at times be not running is drawn through the shell of the always running compressor of the system. Various other modifications will occur to those skilled in the art.

What we claim is:

1. A variable capacity multiple compressor refrigeration system comprising first and second *hermetic shell* refrigerant compressors, each compressor having suction inlet and discharge ports, *the first compressor having its suction inlet port* adapted to be connected to the suction line of the system, *and the second compressor having its suction inlet port connected to the interior of the shell of the first compressor so that gas received by said second compressor is received only through the shell of said first compressor,* means to connect the discharge ports in parallel to the refrigeration system, means to cycle-off said second compressor while the first compressor continues to run for reduced capacity of the system, a check valve in said means to connect to prevent discharge gas from said first compressor from entering the discharge port of the second cycled-off compressor, a bypass line connected to the suction of the system and to said means to connect at a point between the check valve and the discharge port of the second compressor, a valve in said bypass line, and valve control means to control said valve to be closed when both compressors are running and to be open when said second compressor is cycled-off, *said first compressor is a multiple cylinder compressor having means to controllably unload some of its cylinders for running part unloaded to reduce the capacity of the system and said first compressor is always running when the system is operating.*

[2. The invention of claim 1 in which said compressors are hermetic shell compressors.]

[3. The invention of claim 1 in which said first compressor is a multiple cylinder compressor having means to controllably unload some of its cylinders for running part unloaded to reduce the capacity of the system.]

[4. The invention of claim 3 in which said compressors are hermetic shell compressors.]

5. The invention of claim [4] *1* in which multiple steps of variable capacity are provided [with the inlet of said second compressor being connected to the system through the shell of said first compressor], and a multi-step capacity control comprising logic switch cycle control means responsive to refrigeration demand to cycle both compressors on for one capacity step corresponding to maximum capacity, to operate said first compressor unloading means to unload some of its cylinders while both compressors are cycled-on for a second capacity step of reduced capacity, to cycle-off said second compressor while at the same time operating said first compressor unloading means to not unload any of its cylinders and thereby cause only said first compressor to run at full capacity for a third capacity step of reduced capacity, and to cycle-off said second compressor and at the same time operate said first compressor unloading means to unload some of the cylinders of the first compressor while only the first compressor is running for a fourth capacity step of reduced capacity of the system.

6. The invention of claim [4] *1* in which multiple steps of variable capacity are provided [with the inlet of said second compressor being connected to the system through the shell of said first compressor], and a multi-step capacity control comprising logic switch cycle control means responsive to refrigeration demand to cycle both compressors on for one capacity step corresponding to maximum capacity, to operate said first compressor unloading means to unload some of its cylinders while both compressors are cycled-on for a second capacity step of reduced capacity, to cycle-off said second compressor and operate said valve control means to control said valve to be open while at the same time operating said first compressor unloading means to not unload any of its cylinders and thereby cause only said first compressor to run at full capacity for a third capacity step of reduced capacity, and to cycle-off said second compressor and operate said valve control means to control said valve to be open and at the same time operate said first compressor unloading means to unload some of the cylinders of the first compressor while only the one compressor is running for a fourth capacity step of reduced capacity of the system.

* * * * *